(12) United States Patent
Lewis

(10) Patent No.: US 7,923,853 B2
(45) Date of Patent: Apr. 12, 2011

(54) METHODS OF SYNCHRONIZING A PLURALITY OF GENERATORS

(75) Inventor: Eric Anthony Lewis, Rugby (GB)

(73) Assignee: Converteam UK Ltd, Warwickshire (GB)

( * ) Notice: Subject to any disclaimer, the term of this patent is extended or adjusted under 35 U.S.C. 154(b) by 592 days.

(21) Appl. No.: 11/999,411

(22) Filed: Dec. 5, 2007

(65) Prior Publication Data

US 2008/0157538 A1 Jul. 3, 2008

(30) Foreign Application Priority Data

Dec. 9, 2006 (GB) ................................ 0624594.8

(51) Int. Cl.
*H02J 1/00* (2006.01)
*H02P 9/00* (2006.01)
(52) U.S. Cl. .............................. 290/44; 322/299; 307/43
(58) Field of Classification Search ................ 290/7, 43, 290/44; 322/29, 32; 307/43, 52, 65
See application file for complete search history.

(56) References Cited

U.S. PATENT DOCUMENTS

| | | | | |
|---|---|---|---|---|
| 3,794,846 A | * | 2/1974 | Schlicher et al. | 307/87 |
| 4,249,088 A | * | 2/1981 | Kleba et al. | 307/87 |
| 4,492,874 A | * | 1/1985 | Near | 290/40 B |
| 5,745,356 A | * | 4/1998 | Tassitino et al. | 363/71 |
| 5,761,073 A | * | 6/1998 | Dickson | 702/75 |
| 6,522,030 B1 | * | 2/2003 | Wall et al. | 307/43 |
| 6,915,186 B2 | * | 7/2005 | Patterson, Jr. | 700/286 |
| 7,181,644 B2 | * | 2/2007 | Millsap et al. | 714/11 |
| 7,656,060 B2 | * | 2/2010 | Algrain | 307/84 |
| 2008/0284252 A1 | * | 11/2008 | Jones et al. | 307/82 |

FOREIGN PATENT DOCUMENTS

| | | |
|---|---|---|
| EP | 1 324 480 A2 | 7/2003 |
| EP | 1561946 | 8/2005 |
| WO | WO 90/05402 | 5/1990 |

* cited by examiner

*Primary Examiner* — Nicholas Ponomarenko
(74) *Attorney, Agent, or Firm* — Kirschstein, et al.

(57) ABSTRACT

A method of synchronizing a plurality of generators connected together in parallel to a supply network. A common synchronization signal can be generated having a frequency versus time pattern that is the same as the frequency versus time pattern of the supply network during normal operating conditions. The common synchronization signal is then supplied to each of the generators to control the level of power that is supplied to the supply network by the generators.

23 Claims, 5 Drawing Sheets

METHODS OF SYNCHRONIZING A PLURALITY OF GENERATORS

FIELD OF THE INVENTION

The present invention relates to methods for synchronizing a plurality of generators connected to a common power grid or supply network during normal operating conditions and also in the event of a network fault. The methods are particularly suitable for use with, but not restricted to, generators that are driven by wind turbines.

The present invention is particular suitable for synchronizing generators using fully rated power converters directly connected to the stator of cage induction electrical machines, permanent magnet electrical machines or superconducting electrical machines.

BACKGROUND OF THE INVENTION

It is possible to convert wind energy to electrical energy by using a wind turbine to drive the rotor of an electrical machine, either directly or by means of a gearbox. The ac frequency that is developed at the stator terminals of the electrical machine (the "stator voltage") is directly proportional to the speed of rotation of the rotor for cage induction electrical machines and permanent magnet electrical machines. The voltage at the terminals of the electrical machine also varies as a function of speed and, for cage induction electrical machines, on the flux level.

For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades. Matching of the variable voltage and frequency of the electrical machine to the nominally constant voltage and frequency of the supply network can be achieved by using a power converter connected between the stator of the electrical machine and the supply network.

A schematic diagram of a group of wind turbines is shown in FIG. 1. Each wind turbine 1a to 1i includes blades and a generator 2 that incorporates a rotating electrical machine, a power converter and associated control circuits as a combined unit. The output of each generator 2 is supplied through a transformer 4 to a local parallel connection 6a to 6d that in turn is connected by means of an electrical cable 8 to the supply network or power grid 10. The conventional arrangement shown in FIG. 1 is to have a small number of wind turbines connected to a local parallel connection. For example, the generators of wind turbines 1a and 1b are connected in parallel to a first local parallel connection 6a, the generators of wind turbines 1c and 1d are connected in parallel to a second local parallel connection 6b, the generators of wind turbines 1e and 1f are connected in parallel to a third local parallel connection 6c and the generators of wind turbines 1g, 1h and 1i are connected in parallel to a fourth local parallel connection 6d.

A number of conventional rotating electrical machines 12 (also called alternators) that are normally sited within a power station, for example, also supply power to the supply network 10. A number of loads 14 are also shown connected to the supply network 10 to represent the users of the power that is distributed through the supply network.

Network codes are used to define the amount of fundamental power and reactive power that electrical machines should export to the supply network 10 during normal operating conditions and also in the event of a network fault or transient conditions. For a large group of wind turbine generators having a combined output of more than 50 MW, for example, then the network codes may require that the group acts as a conventional rotating electrical machine 12 during a network fault. A smaller group of wind turbine generators having a combined output of less than 50 MW, for example, may be subject to less strict requirements.

The generators 2 of the wind turbines 1a to 1i are fully defined in technical publications and a common feature is an individual synchronization signal Sin using the prevailing ac voltage at the local parallel connection to the control unit of the power converter to control the phasing of the fundamental power and reactive power that is delivered to the local supply network at any particular time. However, the use of individual synchronization signals can give rise to stability problems if the fundamental power and reactive power delivered by each generator 2 happens to be different. Further problems with stability can arise if the group of wind turbines is connected to the supply network through one or more very long electrical cables. This might be the case for groups where the wind turbines are sited in remote places such as offshore.

One of the most demanding operations for any generator is when the supply network develops a fault. This is not such of a problem for conventional rotating electrical machines 12 because they are normally large electrical machines and will continue to rotate, due to their large rotational inertia, so that their internal voltages will continue to produce ac currents at the same frequency as before the fault even if the ac voltage of the supply network falls to a value outside the normal operating range including zero voltages. (In practice, there is likely to be a gradual reduction in the frequency of the ac currents as the conventional rotating electrical machine 12 slows down during the lifetime of the fault condition.) It might therefore be said that the conventional rotating electrical machine 12 incorporates a "frequency versus time memory" as a result of their physical construction.

As described above, the generators of the wind turbines require the use of the individual synchronization signals Sin to control the phasing of the fundamental power and reactive power that is delivered to the local supply network. Serious problems can therefore arise during a fault condition when the ac voltage of the local supply network, and hence the prevailing ac voltage at the local parallel connection, falls to a value outside the normal operating range including zero voltages. This might be acceptable for a small group of wind turbines, but if the group of wind turbines is required to act as a conventional rotating electrical machine 12 then the individual generators must stay synchronized before the start of the network fault, during the network fault, as the network fault is clearing and for the following period of normal operation. For all of these periods, the individual generators of the wind turbine group must export, or be ready to export, the required fundamental power and reactive power to the supply network as defined in the various standards and network codes. This is simply not achievable using individual synchronization signals Sin that use the prevailing ac voltage at the local parallel connection.

FIG. 3 is a graph of voltage versus time for the supply network 10 over a series of 20 supply network cycles. The supply network 10 is configured for 50 Hz operation but it will be appreciated that the following description is also applicable to a supply network configured to operate at other frequencies such as 60 Hz, for example. In supply network cycle 4 there is the onset of a supply network fault condition and this lasts until normal operation is established again in supply network cycle 12. The fault condition therefore lasts for 8 supply network cycles, but in practice this may depend on other factors such as the type of fault or transient and the protection apparatus (not shown) associated with the supply network 10. The retained voltage of the supply network 10 during the fault condition is 20%, but it will be readily appreciated that the retained voltage can be any level outside the normal operating range including 0%, depending on the fault.

FIG. 4 is a graph of frequency versus time for the ac current produced by a conventional rotating electrical machine 12 that is connected to the supply network 10. FIG. 5 is a graph of internal electro-motive force (emf) versus time for the conventional rotating electrical machine 12. It can be seen that the internal emf and the frequency of the ac current remain unchanged during the fault condition because the conventional rotating electrical machine 12 incorporates a "frequency versus time memory" as mentioned above.

FIG. 6 is a graph of power (fundamental power and reactive power) versus time for an individual generator 2 of the wind turbine group. It is clear from FIG. 6 that the generator 2 loses power completely during the fault condition and takes time to start to output power again once the fault condition has been cleared at supply network cycle 12.

There is therefore a need for an improved method of synchronizing the generators of the individual wind turbines in a wind turbine group to make sure that the fundamental power and reactive power exported by each generator are synchronized for all conditions defined by the network codes.

The same problems apply to generators that include linear electrical machines driven by wave, tidal and ocean current systems.

SUMMARY OF THE INVENTION

In its broadest sense, the present invention aims to reproduce the "frequency versus time memory" of a conventional rotating electrical machine to enable a plurality of generators to remain synchronized and connected to the supply network or power grid even when the ac voltage of the supply network falls to a value outside the normal operating range during a fault condition. The present invention is therefore particularly applicable to generators that include rotating or linear electrical machines driven by wind, wave, tidal and ocean current systems, for example, and which normally receive individual synchronization signals.

The present invention provides a method of synchronizing a plurality of generators connected together in parallel to a supply network, the method comprising the steps of generating a first common synchronization signal having a frequency versus time pattern that is the same as the frequency versus time pattern of the supply network during normal operating conditions of the supply network, and supplying a second common synchronization signal to each of the generators during a fault condition of the supply network to synchronize the generators during the fault condition.

Even during normal operating conditions of the supply network, the use of a common synchronization signal improves the stability of the generators and the export of power to the supply network. However, the use of a common synchronization signal is of particular benefit during a fault condition of the supply network when the ac voltage of the supply network falls to a value outside the normal operating range until the fault is cleared. This would include the situation where the ac voltage of the supply network falls to zero.

The first common synchronization signal can be supplied to each of the generators during normal operating conditions of the supply network both before and after a fault condition occurs.

In some circumstances it can be advantageous to supply the first common synchronization signal to each of the generators during normal operating conditions of the supply network only before a fault condition occurs, with a different (or third) common synchronization signal being supplied to each of the generators after the fault has been cleared. The third common synchronization signal that is supplied to each of the generators after the fault has been cleared may have a frequency versus time pattern with an increasing frequency. This means that it possible in the period immediately following the fault being cleared to allow for a gradual increase in the frequency of the ac current as a conventional rotating electrical machine recovers and speeds up.

The second common synchronization signal that is supplied during the fault condition may be the same as the first common synchronization signal that is supplied during a normal operating condition of the supply network. Alternatively, a series of common synchronization signals, each having the same or a different frequency versus time pattern, may be supplied in sequence to the generators during each operating condition of the supply network, i.e., before a fault condition occurs, during the fault condition and after the fault has been cleared.

The second common synchronization signal that is supplied to each of the generators during a fault condition of the supply network may have a frequency versus time pattern that is the same as the frequency versus time pattern of the supply network that existed during the previous normal operating conditions. This ensures that the generators remain synchronized with each other, and as far as is practicable to any conventional rotating electrical machines on the supply network, so that power can be exported to the supply network at the optimum level both during the fault condition and as soon as the fault is cleared.

To achieve this synchronization the first common synchronization signal that is generated during normal operating conditions of the supply network can be stored and then supplied to each of the generators during a fault condition of the supply network as the second common synchronization signal.

It can sometimes be useful to more closely reproduce the "frequency versus time memory" of a conventional rotating electrical machine by supplying a common synchronization signal during a fault condition that has a frequency versus time pattern with a decreasing frequency. This allows for the gradual reduction in the frequency of the ac current as the conventional rotating electrical machine slows down during the fault condition.

The actual rate at which the frequency decreases and increases back to a normal operating frequency (i.e., rapid or gradual recovery), can be selected depending on the particular requirements of the network codes and the operating parameters of the supply network or power grid, for example.

The common synchronization signal may be supplied to the generators by any suitable means. For example, the common synchronization signal may be a wireless signal (such as a radio frequency (RF) signal, for example) transmitted from a controller through a suitable wireless transmitter arrangement. The common synchronization signal may also be an electrical or optical signal transmitted from a controller through a cable or optical fiber. The common synchronization signal may also be generated by a controller associated with one of the generators and then transmitted to all of the remaining generators in the wind turbine group. It may be necessary to compensate for hardware delays caused primarily by the transmission time of the common synchronization signal to the generators.

In some circumstances the individual generators could select to use an individual synchronization signal in preference to the common synchronization signal. This could occur, for example, if the common synchronization signal has some type of fault and this would then enable the generators to continue to function.

The present invention further provides an arrangement comprising a plurality of generators connected together in parallel to a supply network, and a controller adapted to: (a) generate a first common synchronization signal having a frequency versus time pattern that is the same as the frequency versus time pattern of the supply network during normal operating conditions of the supply network, and (b) supply a second common synchronization signal to each of the generators during a fault condition to synchronize the generators during the fault condition.

The generators are preferably connected in parallel to a local parallel connection. The local parallel connection is preferably connected to the supply network by at least one electrical cable.

The controller can be implemented in a number of different ways. For example, the controller could be implemented in hardware by using a motor to drive a conventional rotating electrical machine at a constant speed in such a way as to produce an ac voltage that would be compatible with the power requirements of the supply network. The ac voltage can then be used to derive a first common synchronization signal that is indicative of the ac voltages of the supply network during normal operating conditions. In the event of a fault on the supply network, the motor could continue to drive the rotating electrical machine at the constant speed or it could be switched off to allow the frequency of the ac current to reduce as the rotating electrical machine slows down. However, it is more likely that the controller will be implemented electronically.

The controller will normally be powered directly from the supply network but must include an auxiliary power source such as a battery so that it can continue functioning during a fault condition where the ac voltage falls outside the normal operating range. The decision about when to supply a derived versus a stored common synchronization signal to each of the generators will normally be made with reference to the prevailing voltage conditions of the supply network, but it can also be made using external inputs from the operator of the supply network, for example.

Each generator may include a power converter and associated control circuits. In this case, the controller is preferably adapted to apply the common synchronization signal to the control circuit of each of the power converters to control the level of power that is output to the supply network by the generators.

The present invention also provides a plurality of wind turbines, each wind turbine comprising a generator having a stator and a rotor, a power converter, and a turbine assembly including at least one blade for rotating the rotor of the generator, wherein the generators are connected together in parallel to a supply network and are synchronized according to the method described above.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
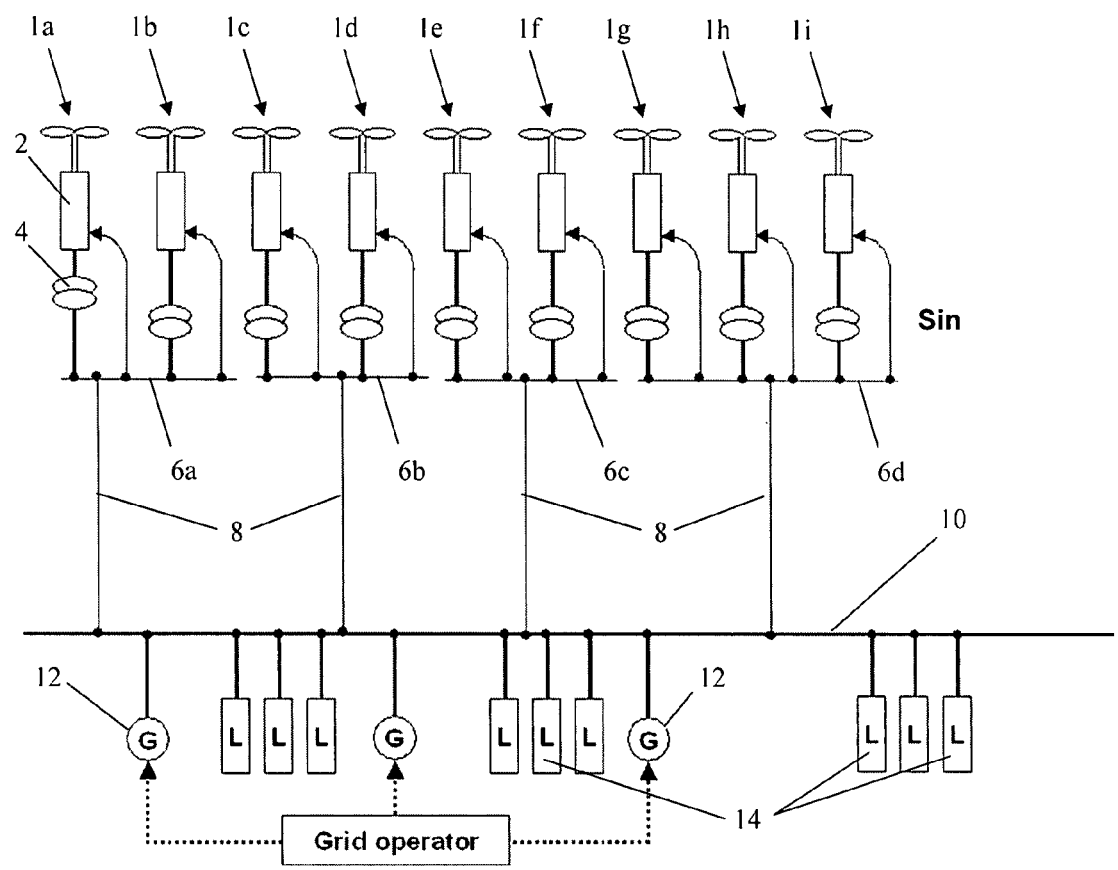
FIG. 1 is a schematic diagram showing a known arrangement of a group of wind turbines, conventional rotating electrical machines and loads connected to a supply network.
Figure 2:
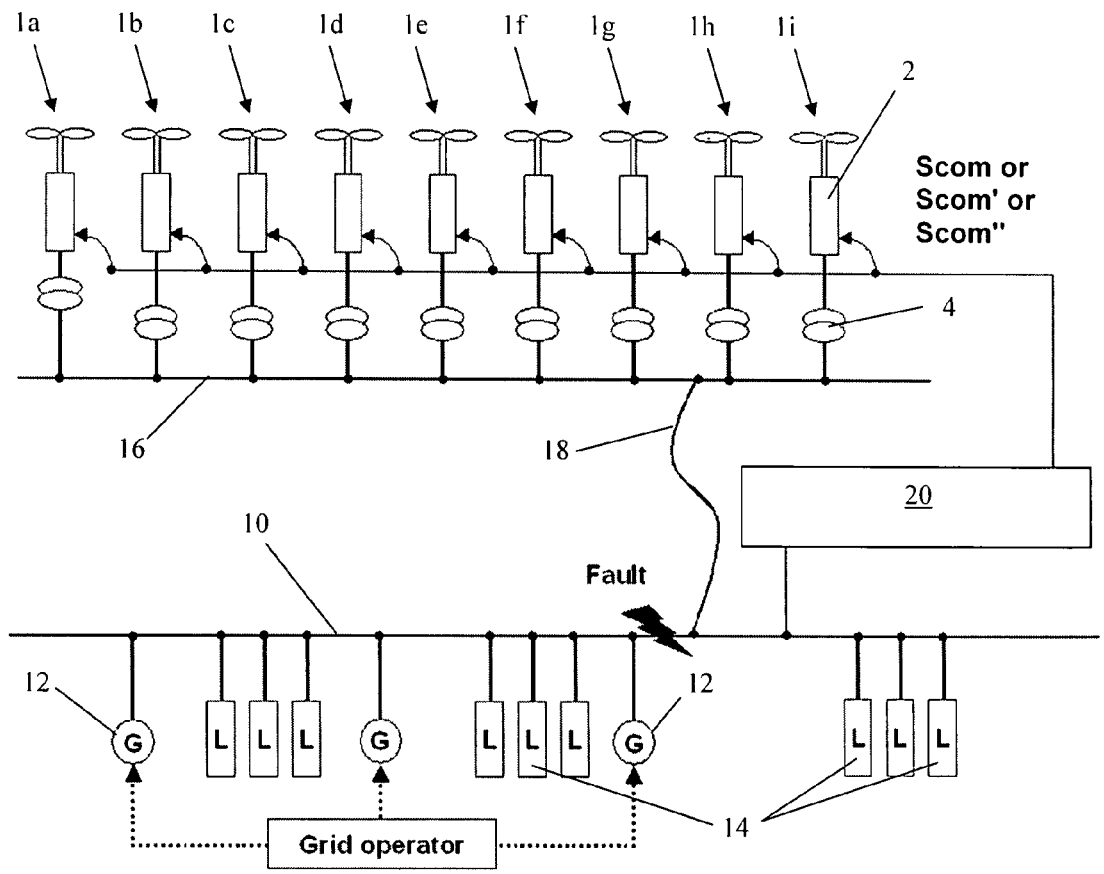
FIG. 2 is a schematic diagram showing an arrangement of a group of wind turbines, conventional rotating electrical machines and loads connected to a supply network where the generators of the wind turbines are controlled and synchronized according to a method of the present invention.

A schematic diagram of a group of wind turbines that are synchronized according to a method of the present invention is shown in FIG. 2. Although this description focuses on wind turbine applications, it will be obvious to the skilled person that the invention has wider applicability. The arrangement of FIG. 2 is similar in many respects to the arrangement of FIG. 1 and like parts have been given the same reference numerals.

Each wind turbine 1*a* to 1*i* includes blades and a generator 2 that incorporates a power converter and control circuits. The output of each generator 2 is supplied through a transformer 4 to a local parallel connection 16 that in turn is connected by means of a single long electrical cable 18 to the supply network or power grid 10. For the purposes of this description it will be assumed that the power output of the group of wind turbines is sufficiently large for the network codes of the supply network 10 to require that the group act as a conventional rotating electrical machine 12 during a network fault.

An electronic controller 20 derives a common synchronization signal Scom that is transmitted to each of the generators 2 (or more particularly to each of the control circuits of the power converters) through a series of electrical cables. The generators 2 use the synchronization signal Scom to control the phasing of the fundamental power and reactive power that is delivered to the supply network 10 at any particular time.

The electronic controller 20 has an input signal indicative of the prevailing voltage of the supply network 10. The controller 20 is therefore able to recognize immediately if the supply network 10 experiences a fault where the ac voltages fall to a value outside the normal operating range.

Figure 7:
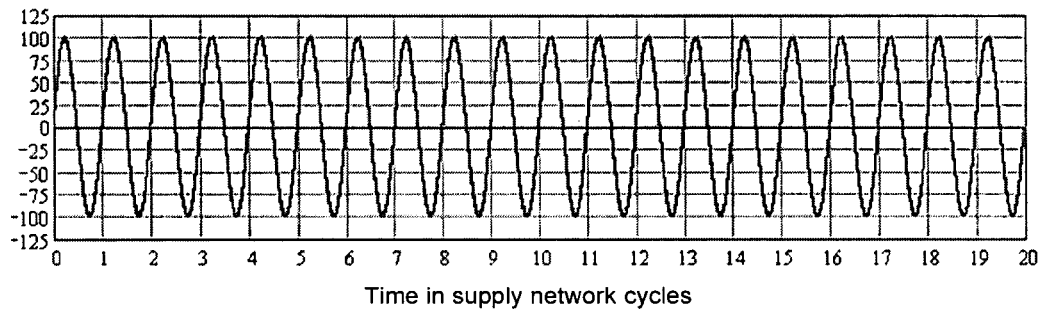
FIG. 7 is a graph of power versus time for an individual generator of a wind turbine group connected to the supply network that is controlled in accordance with the present invention by a common synchronization signal for a situation where the conventional rotating electrical machine does not slow down during a supply network fault condition.
Figure 10:
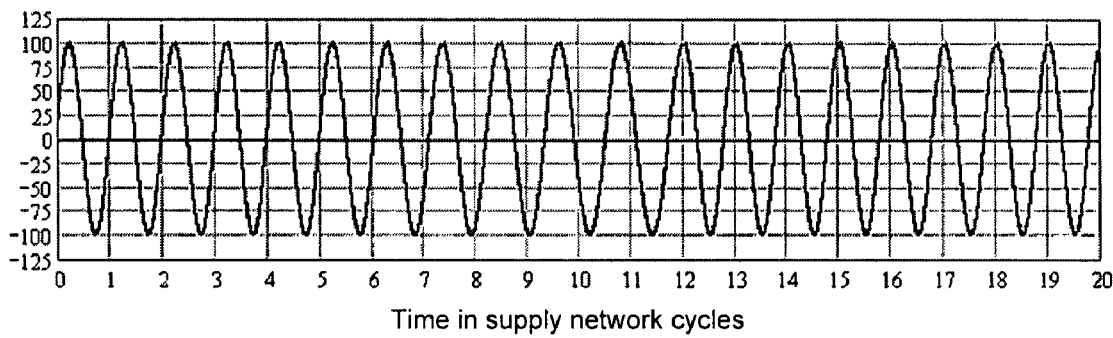
FIG. 10 is a graph of power versus time for an individual generator of a wind turbine group connected to the supply network that is controlled in accordance with the present invention by a common synchronization signal for a situation where the conventional rotating electrical machine gradually slows down during a supply network fault condition before recovering rapidly once the fault condition is cleared.
Figure 13:
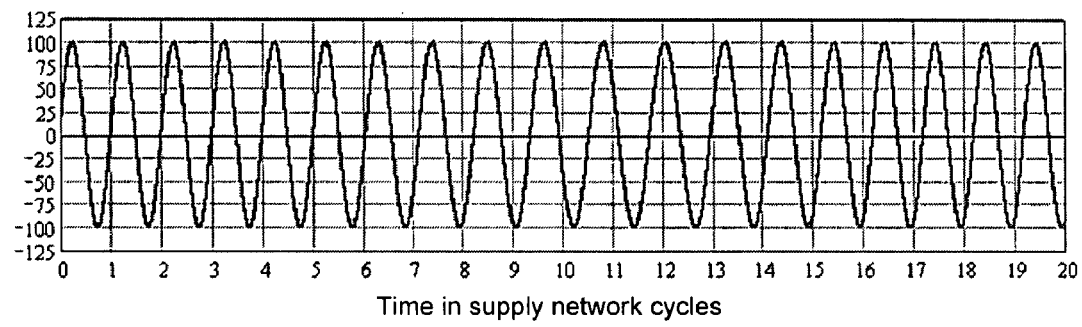
FIG. 13 is a graph of power versus time for an individual generator of a wind turbine group connected to the supply network that is controlled in accordance with the present invention by a common synchronization signal for a situation where the conventional rotating electrical machine gradually slows down during a supply network fault condition before recovering gradually once the fault condition is cleared.

The synchronization signal Scom will normally be directly connected to the same connection point that is used by the individual synchronization signal Sin. In this case, the synchronization signal Scom will naturally be a voltage signal of sinusoidal shape with the appropriate voltage level that depends on the design of the particular generators. The waveforms for the synchronization signal Scom will then be directly as shown in FIGS. 7, 10 and 13. However, the relevant voltage, frequency and phase data can be transmitted to each generator 2 by any type of analogue or digital communication signal and protocol.

When the supply network 10 is operating normally, the frequency and phase of the synchronization signal Scom that is derived by the electronic controller 20 is identical to the prevailing frequency and phase of the ac voltages of the supply network 10. The synchronization signal Scom is transmitted to each of the generators 2 and is continuously stored in the electronic controller 20. The regular sampling and storage of the synchronization signal Scom can be implemented using any suitable electronic storage techniques.

If the supply network 10 develops a fault condition then the electronic controller 20 will immediately start to transmit the stored synchronization signal Scom' to each of the generators 2. The phase and frequency of the stored synchronization signal Scom' that is transmitted during a supply network fault condition is therefore identical to the prevailing frequency and phase of the ac voltages of the supply network 10 during normal operating conditions (i.e., before the fault condition occurred). This means that the phase of the stored synchronization signal Scom' transmitted by the electronic controller 20 during a supply network fault condition may not match the phase of the input signal indicative of the prevailing voltage of the supply network 10.

Once the electronic controller 20 recognizes that the fault condition has been cleared, it will immediately derive a new synchronization signal Scom" with a frequency and phase that is identical to the prevailing frequency and phase of the ac voltages supply network. The frequency and phase of the stored synchronization signal Scom' will then be smoothly changed to become the new synchronization signal Scom" in a preset period, typically one supply network cycle.

Figure 3:
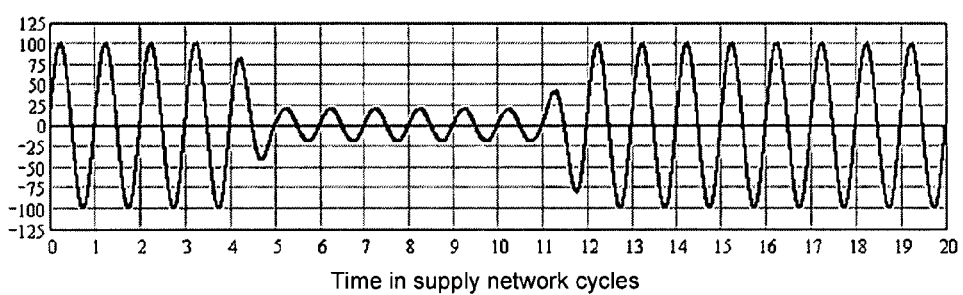
FIG. 3 is a graph of voltage versus time for a supply network over a series of 20 supply network cycles.
Figure 4:
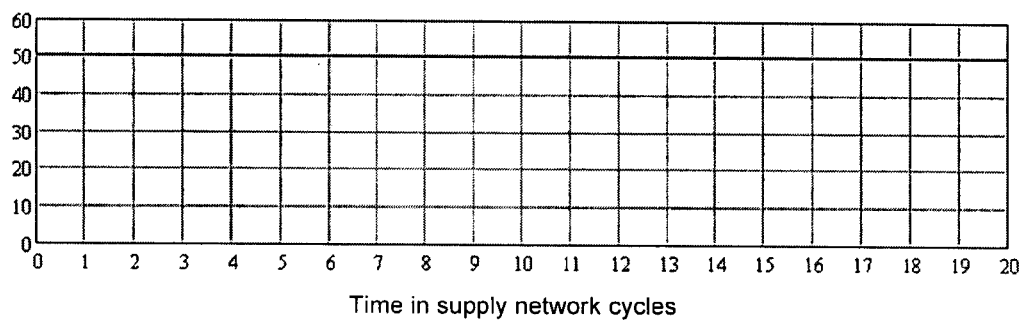
FIG. 4 is a graph of frequency versus time for the ac current produced by a conventional rotating electrical machine that is connected to the supply network for a situation where the conventional rotating electrical machine does not slow down during a supply network fault condition.
Figure 5:
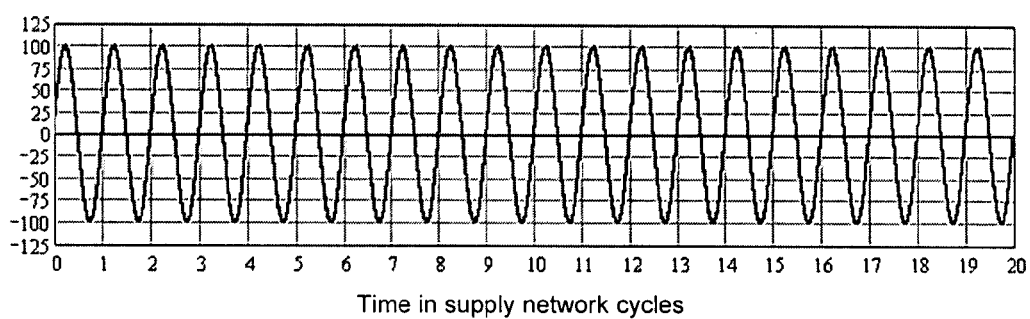
FIG. 5 is a graph of internal electro-motive force (emf) versus time for a conventional rotating electrical machine for a situation where the conventional rotating electrical machine does not slow down during a supply network fault condition.
Figure 6:
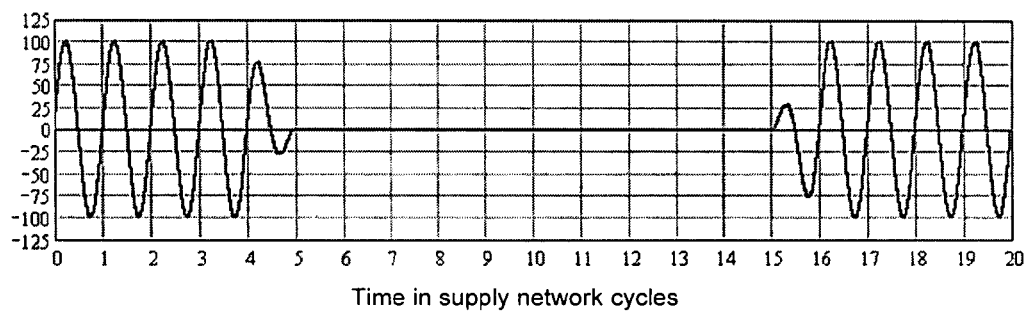
FIG. 6 is a graph of power versus time for an individual generator of a wind turbine group connected to the supply network that is controlled using individual synchronization signals that use the prevailing ac voltage at the local parallel connection.

FIG. 7 is a graph of power (fundamental power and reactive power) versus time for an individual generator 2 of the wind turbine group. During supply network cycles 1 to 4 the electronic controller 20 transmits a synchronization signal Scom to the generator 2 and stores the synchronization signal. The frequency and phase of the synchronization signal Scom that is transmitted to the generator 2 during supply network cycles 1 to 4 is identical to the prevailing frequency and phase of the ac voltages of the supply network shown in FIG. 3. At supply network cycle 4 the electronic controller 20 recognizes that a supply network fault condition has occurred and immediately starts to transmit the stored synchronization signal Scom' to the generator 2. (For the purposes of this example it may be assumed that the synchronization signal Scom is sampled and stored once every supply network cycle, in which case the stored synchronization signal Scom' would be the synchronization signal that was stored during supply network cycle 3 before the fault condition occurred.) The stored synchronization signal Scom' is transmitted during supply network cycles 4 to 11. At supply network cycle 12 the electronic controller 20 recognizes that the fault has cleared and smoothly changes to transmit a new synchronization signal Scom" in a preset period. The new synchronization signal Scom" has a frequency and phase that is identical to the prevailing frequency and phase of the ac voltages of the supply network (i.e., the frequency and phase of the ac voltages of the supply network after the fault is cleared). FIG. 7 shows that the generator 2 can continue to output power before, during and after a supply network fault condition in exactly the same way as the conventional rotating electrical machine 12.

Figure 8:
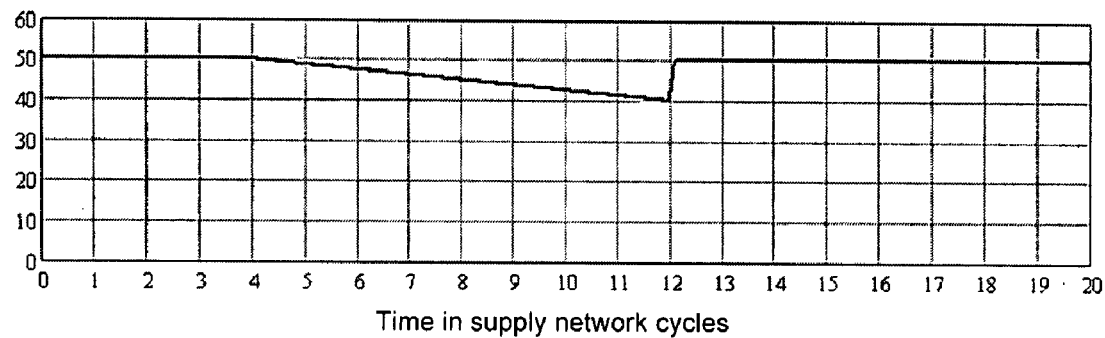
FIG. 8 is a graph of frequency versus time for the ac current produced by a conventional rotating electrical machine that is connected to the supply network for a situation where the conventional rotating electrical machine gradually slows down during a supply network fault condition before recovering rapidly once the fault condition is cleared.

In practice, it might be expected that the frequency of the ac current produced by the conventional rotating electrical machine 12 would gradually reduce during the fault condition as the conventional rotating electrical machine slows down before recovering rapidly once the fault is cleared. This is shown in FIG. 8, which is a graph of frequency versus time for the ac current produced by the conventional rotating electrical machine 12. The frequency reduces gradually in a substantially linear manner throughout the lifetime of the fault condition from a normal operating frequency of 50 Hz in supply network cycle 4 to a frequency of 40 Hz in supply network cycle 12. When the fault is cleared, the frequency of the ac current is restored rapidly to the normal operating frequency of 50 Hz. This can happen if the conventional rotating electrical machine 12 is small and is reconnected to other larger electrical machines after the fault, for example. The rate at which the frequency of the ac current will fall will depend on the properties and characteristics of the conventional rotating electrical machine 12.

Figure 9:
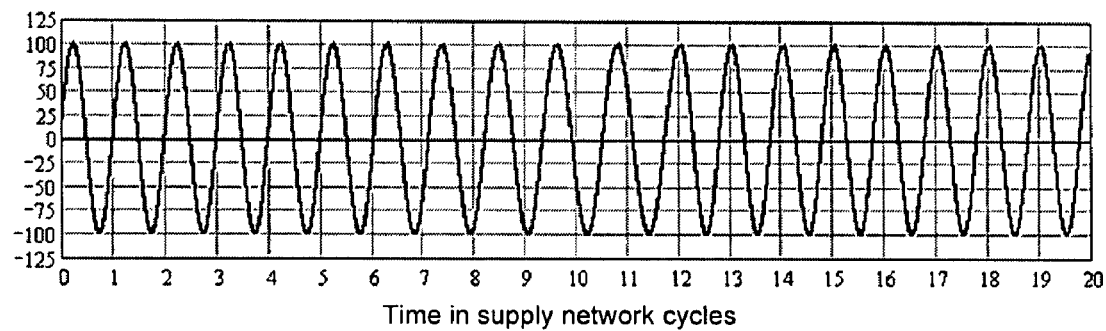
FIG. 9 is a graph of internal emf versus time for a conventional rotating electrical machine for a situation where the conventional rotating electrical machine gradually slows down during a supply network fault condition before recovering rapidly once the fault condition is cleared.

FIG. 9 is a graph of internal emf versus time for the situation where the conventional rotating electrical machine 12 slows down. It can be seen that the frequency of the internal emf of the conventional rotating electrical machine 12 reduces gradually during the lifetime of the fault condition by noting how the spacing between the adjacent peaks and troughs gradually increases between supply network cycles 4 and 12.

It is possible to reproduce the gradual reduction in the frequency of the ac current produced by the conventional rotating electrical machine 12 by reducing the frequency of the synchronization signal that is transmitted to the generators 2 during a supply network fault condition in a corresponding manner. For example, the electronic controller 20 may transmit a modified synchronization signal (that is optionally initially based on the frequency and phase of the stored synchronization signal Scom') where the frequency of the modified synchronization signal is reduced at a predetermined rate. In this case, a minimum frequency limit can be supplied to the modified synchronization signal. FIG. 10 shows how the generator 2 can be controlled by a modified synchronization signal to output power with a frequency that reduces gradually during the lifetime of the fault condition in exactly the same way as the conventional rotating electrical machine 12.

Figure 11:
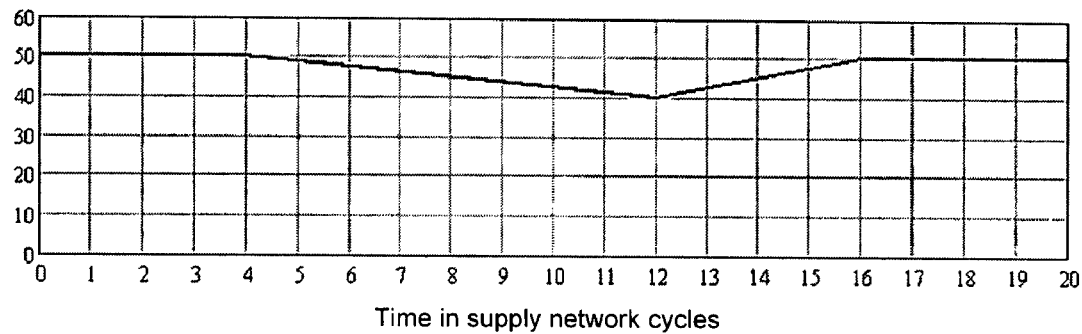
FIG. 11 is a graph of frequency versus time for the ac current produced by a conventional rotating electrical machine that is connected to the supply network for a situation where the conventional rotating electrical machine gradually slows down during a supply network fault condition before recovering gradually once the fault condition is cleared.

In other situations the frequency of the ac current produced by the conventional rotating electrical machine 12 may gradually reduce as the conventional rotating electrical machine slows down during the fault condition and then recover gradually after the fault has been cleared. This is shown in FIG. 11, which is a graph of frequency versus time for the ac current produced by the conventional rotating electrical machine 12. The frequency reduces gradually in a substantially linear manner throughout the lifetime of the fault condition from a normal operating frequency of 50 Hz in supply network cycle 4 to a frequency of 40 Hz in supply network cycle 12. When the fault is cleared, the frequency of the ac current increases gradually until the normal operating frequency of 50 Hz is reached at supply network cycle 16. The rate at which the frequency of the ac current will fall and recover will depend on the properties and characteristics of the conventional rotating electrical machine 12.

Figure 12:
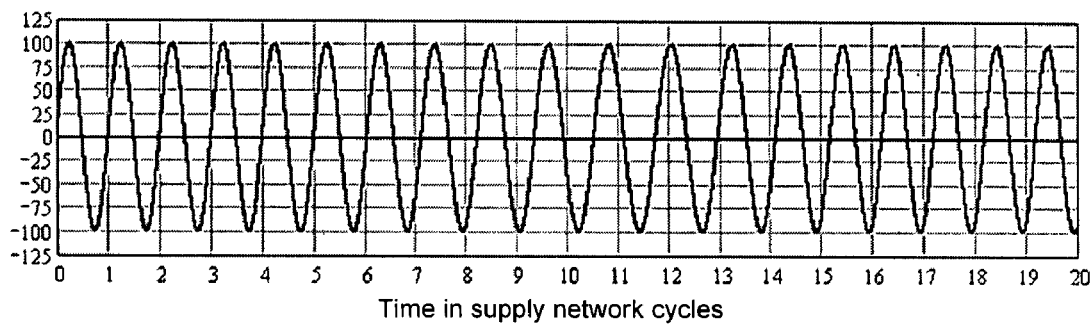
FIG. 12 is a graph of internal emf versus time for a conventional rotating electrical machine for a situation where the conventional rotating electrical machine gradually slows down during a supply network fault condition before recovering gradually once the fault condition is cleared.

FIG. 12 is a graph of internal emf versus time for the situation where the conventional rotating electrical machine 12 slows down during the fault condition and speeds up gradually after the fault has cleared. It can be seen that the frequency of the internal emf of the conventional rotating electrical machine 12 reduces gradually during the lifetime of the fault condition by noting how the spacing between the adjacent peaks and troughs gradually increases between supply network cycles 4 and 12. When the fault is cleared, the frequency of the internal emf of the conventional rotating electrical machine 12 increases gradually between supply network cycles 12 and 16.

It is possible to reproduce the gradual reduction and recovery in the frequency of the ac current produced by the conventional rotating electrical machine 12 by reducing and then increasing the frequency of the synchronization signal that is transmitted to the generators 2 during and after a supply network fault condition in a corresponding manner. For example, the electronic controller 20 may transmit a modified synchronization signal (that is optionally initially based on the frequency and phase of the stored synchronization signal Scom') where the frequency of the modified synchronization signal is reduced at a predetermined rate while the fault condition occurs and where the frequency of the modified synchronization signal is increased at a predetermined rate after the fault is cleared. FIG. 13 shows how the generator 2 can be controlled by a modified synchronization signal to output power with a frequency that reduces gradually during the lifetime of the fault condition and increases gradually when the fault is cleared in exactly the same way as the conventional rotating electrical machine 12.

By transmitting a common synchronization signal as described above, the generators 2 of the wind turbines 1a to 11 can remain connected to the supply network 10 and will remain synchronized with each other so that they can start to export power to the supply network at the correct level once the fault is cleared.

The synchronization signals Scom, Scom' and Scom" can be supplied to one cluster of generators 2 or to several clusters of generators, each cluster having its own connection (e.g., the electrical cable 18) to the supply network 10.

What is claimed is:

1. A method of synchronizing a plurality of generators connected together in parallel to a supply network, the method comprising the steps of:
    generating a first common synchronization signal having a frequency versus time pattern that is the same as the frequency versus time pattern of the supply network during normal operating conditions of the supply network; and
    supplying a second common synchronization signal to each of the generators during a fault condition of the supply network to synchronize the generators during the fault condition.

2. The method according to claim 1, wherein the first common synchronization signal is supplied to each of the generators to synchronize the generators during normal operating conditions of the supply network both before and after the fault condition occurs.

3. The method according to claim 1, wherein the first common synchronization signal is supplied to each of the generators to synchronize the generators during normal operating conditions of the supply network before the fault condition occurs.

4. The method according to claim 3, further comprising the step of supplying a third common synchronization signal to each of the generators to synchronize the generators after the fault condition has cleared.

5. The method according to claim 4, wherein the third common synchronization signal that is supplied to each of the generators after the fault condition has cleared has a frequency versus time pattern with an increasing frequency.

6. The method according to claim 1, wherein the second common synchronization signal that is supplied to each of the generators during the fault condition of the supply network has a frequency versus time pattern that is the same as the frequency versus time pattern of the supply network that existed during the previous normal operating conditions.

7. The method according to claim 1, further comprising the steps of storing the first common synchronization signal that is generated during normal operating conditions of the supply network and supplying the stored common synchronization signal to each of the generators during the fault condition of the supply network as the second common synchronization signal.

8. The method according to claim 1, wherein the second common synchronization signal that is supplied to each of the generators during the fault condition of the supply network has a frequency versus time pattern with a decreasing frequency.

9. An arrangement comprising a plurality of generators connected together in parallel to a supply network, and a controller adapted to:
    (a) generate a first common synchronization signal having a frequency versus time pattern that is the same as the frequency versus time pattern of the supply network during normal operating conditions of the supply network, and
    (b) supply a second common synchronization signal to each of the generators during a fault condition of the supply network to synchronize the generators during the fault condition.

10. The arrangement according to claim 9, wherein the controller is adapted to supply the first common synchronization signal to each of the generators to synchronize the generators during normal operating conditions of the supply network both before and after the fault condition occurs.

11. The arrangement according to claim 9, wherein the controller is adapted to supply the first common synchronization signal to each of the generators to synchronize the generators during normal operating conditions of the supply network before the fault condition occurs.

12. The arrangement according to claim 11, wherein the controller is adapted to supply a third common synchronization signal to each of the generators to synchronize the generators after the fault condition has cleared.

13. The arrangement according to claim 12, wherein the third common synchronization signal that is supplied to each of the generators after the fault condition has cleared has a frequency versus time pattern with an increasing frequency.

14. The arrangement according to claim 9, wherein the second common synchronization signal that is supplied to each of the generators during the fault condition of the supply network has a frequency versus time pattern that is the same as the frequency versus time pattern of the supply network that existed during the previous normal operating conditions.

15. The arrangement according to claim 9, wherein the controller is adapted to store the first common synchronization signal that is generated during normal operating conditions of the supply network and supply the stored common synchronization signal to each of the generators during the fault condition of the supply network as the second common synchronization signal.

16. The arrangement according to claim 9, wherein the second common synchronization signal that is supplied to each of the generators during a fault condition of the supply network has a frequency versus time pattern with a decreasing frequency.

17. The arrangement according to claim 9, wherein the generators are connected in parallel to a local parallel connection.

18. The arrangement according to claim 17, wherein the local parallel connection is connected to the supply network by an electrical cable.

19. The arrangement according to claim 9, wherein the controller is implemented electronically.

20. The arrangement according to claim 9, wherein each generator includes a power converter with associated control circuits and the controller is adapted to apply the common synchronization signal to the control circuit of each power converter to control the level of power that is supplied to the supply network by the generators.

21. A plurality of wind turbines, each wind turbine comprising a generator having a stator and a rotor, a power converter, and a turbine assembly including at least one blade for rotating the rotor of the generator, wherein the generators are connected together in parallel to a supply network and are synchronized according to a method comprising the steps of:
generating a first common synchronization signal having a frequency versus time pattern that is the same as the frequency versus time pattern of the supply network during normal operating conditions of the supply network; and
supplying a second common synchronization signal to each of the generators during a fault condition of the supply network to synchronize the generators during the fault condition.

22. A method of synchronizing a plurality of generators connected together in parallel to a supply network, the method comprising the step of:
supplying a common synchronization signal to each of the generators during a fault condition of the supply network to synchronize the generators during the fault condition, the common synchronization signal having a frequency versus time pattern that is the same as the frequency versus time pattern of the supply network that existed during previous normal operating conditions of the supply network.

23. A method of synchronizing a plurality of generators connected together in parallel to a supply network, the method comprising the step of:
supplying a common synchronization signal to each of the generators during a fault condition of the supply network to synchronize the generators during the fault condition, the common synchronization signal having a frequency versus time pattern with a decreasing frequency.

* * * * *